United States Patent [19]
Tanasawa et al.

[11] 3,837,814
[45] *Sept. 24, 1974

[54] EXHAUST GAS CLEANING DEVICE

[75] Inventors: Yasusi Tanasawa, Nagoya; Mitsumasa Yamada, Shizuoka; Mikiji Ito, Nagoya; Kenji Ishiguro, Aichi, all of Japan

[73] Assignees: Nippondenso Co., Ltd., Kariya-shi; Toyota Jidosha Kogyo Kabushika Kaisha, Tokyo-shi; Kabushiki Kaisha Toyota Chuo Kenkyusho, Nagoya-shi, all of, Japan

[22] Filed: Oct. 28, 1971

[21] Appl. No.: 193,473

[ * ] Notice: The portion of the term of this patent subsequent to Apr. 9, 1991, has been disclaimed.

[30] Foreign Application Priority Data
Dec. 1, 1970  Japan............................. 45-106601
Dec. 26, 1970 Japan............................. 45-128989
Dec. 26, 1970 Japan............................. 45-128990

[52] U.S. Cl..................... 23/277 C, 60/286, 60/289, 60/290, 60/303
[51] Int. Cl............................................ F01n 3/14
[58] Field of Search....... 23/277 C, 288 F; 423/212, 423/213, 214; 60/288, 289, 290, 60/286, 294, 279

[56] References Cited
UNITED STATES PATENTS
1,847,506  3/1932  White......................... 23/288 F UX
2,203,554  6/1940  Uhri, Jr. et al..................... 23/277 C
3,066,755  12/1962 Diehl................................. 60/279 X
3,086,353  4/1963  Ridgway.......................... 23/288 F
3,203,168  8/1965  Thomas............................... 60/286
3,360,927  1/1968  Cornelius..................... 23/27 C UX
3,650,111  3/1972  Reichhelm..................... 23/277 C X
3,724,220  4/1973  Tanasawa et al............... 23/277 C X Primary Examiner—James H. Tayman, Jr.
Attorney, Agent, or Firm—Cushman, Darby & Cushman

[57] ABSTRACT

In an exhaust gas cleaning device comprising an exhaust gas combustion chamber provided in the exhaust system into which the exhaust gases as well as secondary air are fed in a tangential direction with respect thereto to form a vortical current of the burning gases with secondary fuel supplied thereto, the quantity of secondary air and secondary fuel being respectively regulated by respective regulating means which are controlled by a control relay according to the temperature of said exhaust gas combustion chamber and the suction vacuum of the engine, so as to maintain the exhaust gas combustion chamber in desirable condition.

5 Claims, 6 Drawing Figures

EXHAUST GAS CLEANING DEVICE

BACKGROUND OF THE INVENTION

1. Field of the Invention

This invention relates to a device for cleaning the exhaust gases of engines, particularly engines of automotive vehicles, by burning said exhaust gases in an exhaust gas combustion chamber with secondary fuel and secondary air supplied thereto, which exhaust gas combustion chamber is provided intermediate of the exhaust pipe of the engine.

2. Description of the Prior Art

For cleaning the exhaust gases from an engine to a high degree by oxidizing said exhaust gases downstream of the exhaust valve, manifold reactors, after-burners and catalytic converters have been used. However, with the manifold reactor or after-burner in which the exhaust gases are burned only with secondary air supplied thereto, it is generally difficult to obtain stable continuous combustion of the exhaust gases under the varying operating conditions of the engine. In addition, the combustion chamber is readily heated to a temperature above 1000°C after the commencement of combustion therein and in order to achieve satisfactory cleaning of the exhaust gases the material of which the combustion chamber-forming members are made must be sufficiently resistive to a temperature of 1,000°–1,100°C even when temperature of the combustion chamber is controlled by by-passing the exhaust gases or interrupting the supply of the secondary air. However, such a heat-resistant material is commercially not available and must be newly developed. The catalytic converter is capable of cleaning the exhaust gases with high efficiency even when the reaction temperture of a catalyst is on the order of 500°–600°C, but on the other hand, has the disadvantage that the catalyst is heavily deteriorated by the lead present in the gasoline and, during the low speed operation of the engine as in the case when the vehicle travels in an urban area, the catalytic activity thereof is degraded by soot, etc. attaching to the catalyst and, therefore, a catalyst having a serviceable life of 50,000 miles as required in the United States of America can hardly be obtained.

In recent years, however, there have been proposed devices (secondary fuel supplying type after-burners) which are so designed that the exhaust gases are cleaned by burning them in an exhaust gas combustion chamber provided intermediate of the exhaust pipe, with secondary fuel and secondary air supplied thereto. These after-burners, particularly those of an eddy combustion type, are excellent in their characteristic of maintaining continuous combustion of the exhaust gases in the combustion chamber and free of a detonative combustion called after-burn which tends to occur in after-burners. Moreover, the wall temperature of the combustion chamber can be maintained at 700°–800°C even when the internal temperature of the combustion chamber reaches a level as high as about 1,000°C, so that the material of which the device is made is not required to be so highly resistive to heat as required for the materials of the other types of after-burners or manifold reactors and the commercially available materials can be used without newly developing heat-resistant materials. In this view, the after-burners of the type described are highly practicable.

However, in order to achieve perfect cleaning of exhaust gases constantly under the varying operating conditions of the engine, with the above-described secondary fuel supplying type after-burners, the high temperature gases resulting from the combustion of the secondary fuel must be constantly sufficiently supplied to the exhaust gases. Thus, under some operating conditions of the engine the self-combustion of the exhaust gases may be obtained only with the supply of the secondary air, but if the supply of the secondary fuel is interrupted or decreased in this case, re-starting the secondary fuel supply or increasing the quantity of the secondary fuel in quick response to a sudden change in operating mode of the engine to a phase in which the self-combustion of the exhaust gases is impossible, to achieve perfect cleaning is practically difficult. After all, for achieving perfect combustion of the exhaust gases constantly, a large quantity of secondary fuel has to be constantly supplied to burn the exhaust gases. Therefore, it will be understood that the secondary fuel supplying type after-burners described above are uneconomical in that a large quantity of secondary fuel is required.

Further, the secondary fuel supplying type after-burners, as opposed to the ordinary after-burners and manifold reactors, involve the problem that a perfect oxidation reaction of the exhaust gases cannot be obtained and hence the cleaning efficiency is low for a period of a few minutes after the engine is started because the structure of the combustion chamber is cold and the internal temperature of the same is low during this period.

Furthermore, the manifold reactors and the after-burners, whether the secondary fuel is supplied or not, generally have the problem that the structural members of the exhaust gas combustion chamber are overheated to above 1,000°C and subjected to thermal breakage by the heat of the exhaust gases during continuous operation of the engine at high speeds and under high loads. Such an undesirable phenomenon is also liable to occur in the eddy combustion type secondary fuel supplying type after-burners.

SUMMARY OF THE INVENTION

In order to solve the problems set forth above, the present invention has for its object the provision of an extremely useful exhaust gas cleaning device of the type in which the exhaust gases are cleaned by being burned in an exhaust gas combustion chamber with secondary fuel and secondary air supplied thereto, said device comprising means for detecting the temperature of said exhaust gas combustion chamber and means for controlling the quantity of the secondary fuel and the quantity of the secondary air supplied to said combustion chamber according to the detected temperature of the combustion chamber in such a manner that larger quantities of the secondary fuel and secondary air are supplied to the combustion chamber before the internal temperature of said combustion chamber reaches the normal reaction temperature immediately after the engine is started than after the combustion chamber has reached said normal reaction temperature to burn the exhaust gases, whereby the exhaust gases immediately after starting the engine can be cleaned perfectly and economically.

It has been one of the serious drawbacks of conventional heat-exchange type after burners or manifold reactors that the internal structure of the exhaust gas combustion chamber inevitably becomes complicated for the purpose of enhancing the combustion efficiency of the combustion chamber and the thermal capacity of the combustion chamber becomes larger as the internal structure becomes more complicated, with the result that the period of time becomes undesirably long before the interior of the combustion chamber is heated and a complete combustion of the exhaust gases takes place in said combustion chamber and hence the period of time in which the exhaust gases are incompletely cleaned becomes undesirably long.

Another object of the invention, therefore, is to provide an exhaust gas cleaning device of the character described above, which further comprises means for creating a high temperature portion disposed in the central portion of the hollow combustion chamber, whereby the thermal capacity of the combustion is made very small and the exhaust gas cleaning operation can be readily obtained after starting the engine.

Still another object of the invention is to provide an exhaust gas cleaning device of the character described above, which further comprises means for decreasing or shutting down the supplies of the secondary fuel and secondary air when the internal temperature of the exhaust gas combustion chamber rises to an excessively high level as a result, for example, of continuous operation of the engine at high speeds and under high loads, whereby overheating of the structural members of the combustion chamber is avoided and a highly practical, highly efficient cleaning operation can be obtained with no danger of breakage of the device under any operating condition of the engine.

Still another object of the invention is to provide an exhaust gas cleaning device of the character described above, which further comprises a heat accumulator made of a heat-resistant material, such as ceramics, which is disposed within the exhaust gas combustion chamber. The heat accumulator is heated by the high temperature gases resulting from the combustion of the secondary fuel to provide an ignition source, whereby once said heat accumulator has been red-heated, a stable exhaust gas cleaning effect can be constantly achieved under the varying operating conditions of the engine by the heat of the exhaust gases and the heat of said heat accumulator while requiring only a small quantity of the secondary fuel to maintain the heat accumulator in the red-heated state.

Still another object of the invention is to provide an exhaust gas cleaning device of the character described above, which comprises both the means for controlling the quantity of the secondary fuel and the quantity of the secondary air supplied to said combustion chamber according to the detected temperature of the combustion chamber in such a manner that larger quantities of the secondary fuel and secondary air are supplied to the combustion chamber immediately after the engine is started and before the internal temperature of said combustion chamber reaches the normal reaction temperature than after the same has reached said normal reaction temperature, and the means for decreasing or shutting down the supply of the secondary fuel and secondary air when the internal temperature of the exhaust gas combustion chamber rises to an excessively high level as a result, for example, of continuous operation of the engine at high speeds and under high loads. Thus perfect cleaning of the exhaust gases immediately after start of the engine can be achieved economically and overheating of the structural members of the combustion chamber can be avoided, and thus a highly economical, highly efficient exhaust gas cleaning effect can be achieved under any operating condition of the engine with no danger of breakage of the device.

The atmospheric pollution by the exhaust gases even after the engine has become hot is not neligible because when the engine is quickly accelerated, the amount of the exhaust gases is large, and even though the exhaust gases contain small amounts of unburned components, the oxidation of such exhaust gases is difficult because the exhaust gases are large in amount. As a method of overcoming this difficulty, the quantity of the secondary fuel to be burned is increased in the exhaust gas combustion chamber during the period of time immediately after the engine is started and before the internal temperature of the combustion chamber reaches the normal reaction temperature and at times of quick acceleration of the engine. However, when the secondary fuel is supplied through a nozzle as is usual in this type of cleaning device, it is easy to burn a large quantity of fuel instantaneously, but it is difficult, with the same nozzle, to burn a small quantity of fuel in a completely atomized state.

Further, in order to achieve perfect cleaning of the exhaust gases continuously under the varying operating conditions of the engine, in the above-described secondary fuel supplying type after-burner, the high temperature gases resulting from the combustion of the secondary fuel must be sufficiently supplied into the exhaust gases at all times. Thus, while the exhaust gases self-burn under certain operating conditions of the engine with only the secondary air being supplied thereto, if the supply of the secondary fuel is stopped or decreased, it becomes particularly difficult to re-start or increase the supply of secondary air to achieve complete cleaning of the exhaust gases in quick response to a sudden change in the operating mode of the engine to a phase in which the self-combustion of the exhaust gases does not take place. It therefore becomes necessary to continuously supply a large quantity of secondary fuel for the constant and complete cleaning of the exhaust gases by burning same. Therefore, the secondary fuel supplying type after-burner of the type described requires a large quantity of secondary fuel and hence is uneconomical.

It is, therefore, still another object of the invention to provide an exhaust gas cleaning device of the character described above, which further comprises as secondary fuel supply means a fuel evaporator consisting of a porous body, in addition to the fuel injection nozzle. An arrangement is made such that when a large quantity of secondary fuel is required, the fuel is supplied mainly through the fuel injection nozzle, whereas when a small quantity of secondary fuel is required, the fuel is supplied from the fuel evaporator, whereby the exhaust gases can be cleaned continuously and highly efficiently by the combustion of the secondary fuel even when the quantity of the secondary fuel supplied is varied according to the operating condition of the engine and the state of the combustion chamber.

It is still another object of the invention to provide an exhaust gas cleaning devide of the character described, which further comprises a heat accumulator made of a heat-resistant material, such as ceramics, within the exhaust gas combustion chamber, whereby the cleaning

DESCRIPTION OF THE PREFERRED EMBODIMENTS

Figure 1:
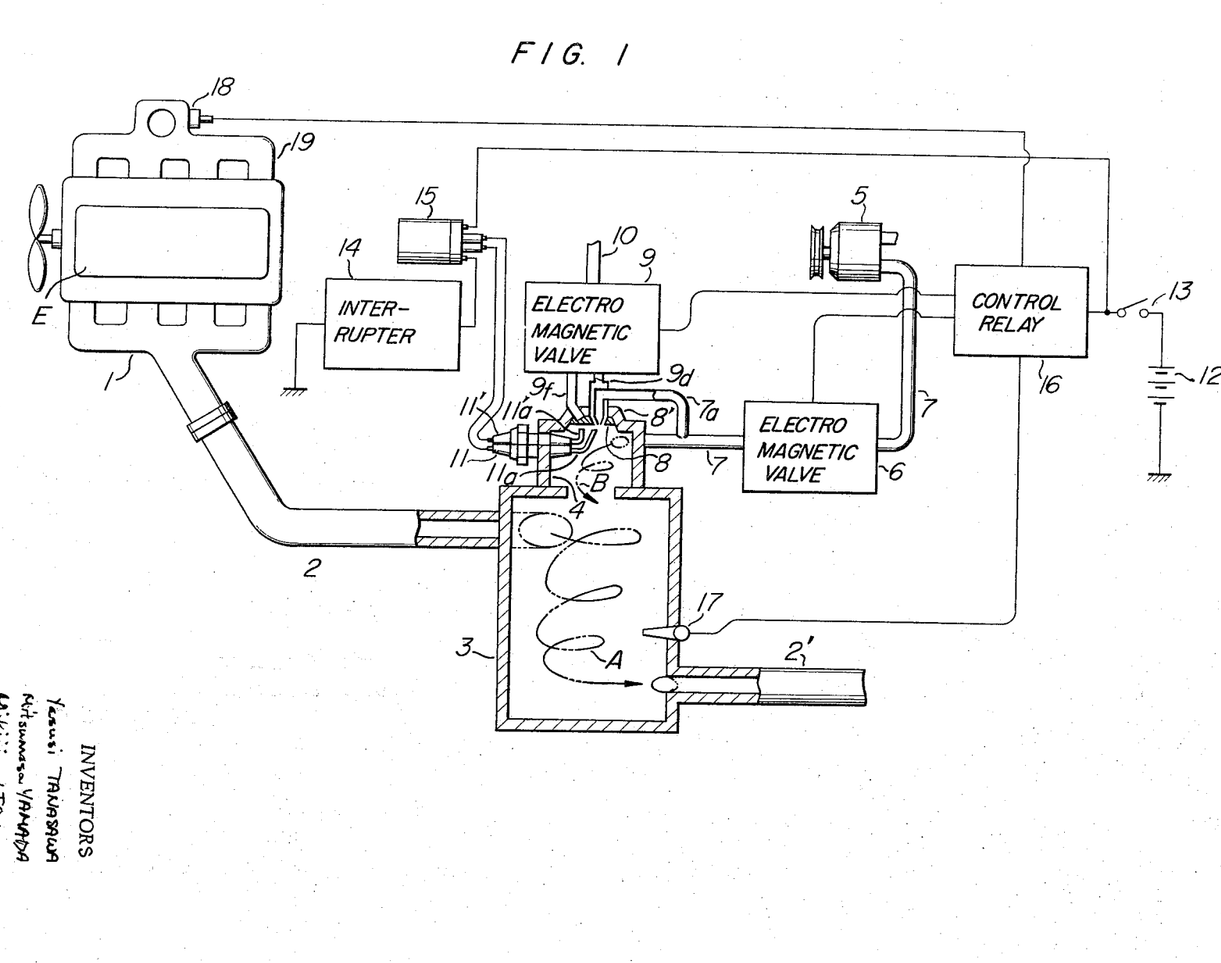
FIG. 1 is a diagrammatical view showing the construction of an embodiment of the exhaust gas cleaning device according to the present invention.

The present invention will be described with reference the embodiments shown in the drawing. Referring to FIG. 1, an exhaust pipe 2 connected at one end with the exhaust manifold 1 of an engine E has the other end open tangentially into a cylindrical exhaust gas combustion chamber 3 on the upstream side thereof. An exhaust pipe 2' is open in the cylindrical side wall of the combustion chamber 3 on the downstream side thereof. Thus, the exhaust gases of the engine swirl within the combustion chamber 3 as indicated by the arrow A. The combustion chamber 3 has a small cylindrical head chamber 4. Secondary air necessary for the combustion of secondary fuel and the exhaust gases is supplied from an air pump 5, driven by the engine, through a pipe 7 and a secondary air regulating electromagnetic valve 6 into said head chamber 4. The pipe 7 is open tangentially in the inner wall of the head chamber 4. The secondary air supplied through said pipe 7 forms a swirling flow within the head chamber 4 as indicated by the arrow B. Centrally of the top wall of the head chamber 4 there is provided a fuel injection nozzle 8. Secondary fuel is supplied from a fuel tank and a fuel pump, not shown, through a secondary fuel regulating electromagnetic valve 9 and a fuel pipe 10 to said fuel injection nozzle 8, and is injected into the head chamber 4 from said nozzle. The fuel injected from the nozzle 8 is completely atomized by the jet of air supplied through an air pipe 7a. An injection plug 11 is fixedly mounted in the head chamber 4 adjacent the nozzle 8. The ignition plug 11 has a central electrode 11a. The nozzle 8 is made of an electrode material and grounded so as to serve simultaneously as an earth electrode cooperating with said central electrode 11a. Reference numeral 12 designates a power source, 13 an ignition switch of the engine, 14 an interrupter and 15 an ignition coil. An arrangement is made such that while the ignition switch 13 is in its closed position, the primary current of the ignition coil 15 is intermittently interrupted by the interrupter 14. The high voltage induced in the secondary coil generates sparks across the central electrode 11a of the ignition plug 11 and the nozzle 8, to fire the fuel injected into the head chamber 4 from the nozzle 8.

The secondary air regulating electromagnetic valve 6, as shown in FIG. 1, has interconnected first and second valves 6a, 6b. The first valve 6a opens and closes a passage between an inlet port 6c and an outlet port 6d which are respectively connected with the pipe 7. The second valve 6b opens and closes a passage between the inlet port 6c and an outlet port 6e which opens into the atmosphere. The electromagnetic valve 6, when a current is conducted through an electromagnetic coil 6f, takes the position shown in FIG. 2, i.e., the position in which the first valve 6a is open thereby communicating the inlet port 6c and the outlet port 6d with each other and the second valve 6b is closed shutting down the communication between the inlet port 6c and the outlet port 6e. When no current is conducted through the electromagnetic coil 6f, the valve 6 takes the position in which the first valve 6a is closed thereby shutting down the communication between the inlet port 6c and the outlet port 6d and the second valve 6b is open thereby communicating the inlet port 6c and the outlet port 6e with each other.

Figure 3A:
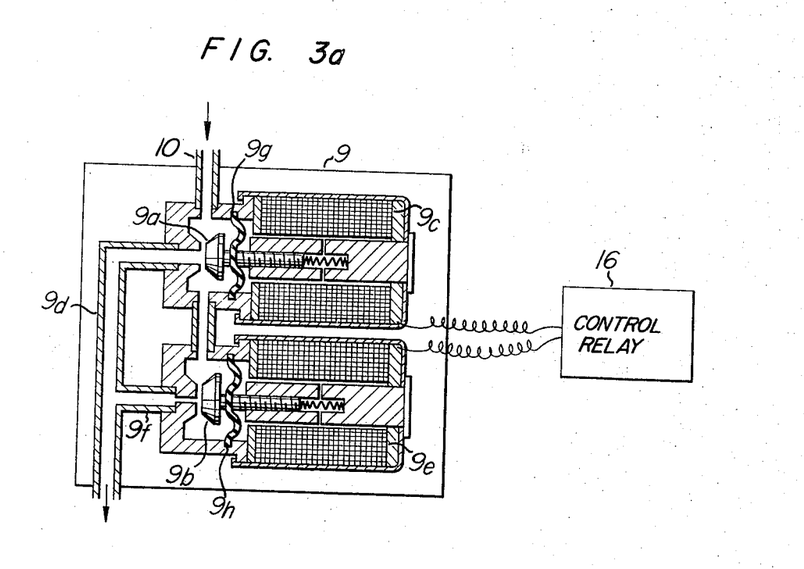
FIG. 3A is a sectional view of one form of the secondary fuel regulating unit used in the device of the invention.

The secondary fuel regulating electromagnetic valve 9 comprises a main or first valve 9a and an auxiliary or second valve 9b as shown in FIG. 3A. The first valve 9a opens a main passage 9d upon energization of an electromagnetic coil 9c and closes the main passage 9d by pressure of spring 9i upon deenergization of the electromagnetic coil 9c. The second valve 9b opens or closes an auxiliary passage 9f upon energization or deenergization respectively, of an electromagnetic coil 9e as the first valve 9a operates. Diaphragms 9g, 9h are provided for preventing intrusion of fuel into the electromagnetic coil portions.

A control relay 16 is electrically connected with a temperature detector 17 provided at a portion of the combustion chamber 3 where the temperature becomes highest, and the electromagnetic valves 6, 9 and a starting switch 13. The control relay 16 operates the electromagnetic valves 6, 9 such that when the temperature detected by the temperature detector 17 is below the normal reaction temperature (e.g., 600°–700°C), the first and second valves 9a, 9b of the electromagnetic valve 9 and the first valve 6a of the electromagnetic valve 6 are opened so that a relatively large quantity of fuel may be supplied to the nozzle 8 and a corresponding quantity of secondary air may be supplied into the head chamber 4 from the pipe 7, whereas when the temperature detected by the temperature detector 17 is in the range from the normal reaction temperature to a preset overheat temperature, e.g., around 900°C, the first valve 9a only of the electromagnetic valve 9 is closed so that a relatively small quantity of secondary fuel may be supplied to the nozzle 8 for the normal combustion. Further when the temperature detected by the temperature detector 17 is above the preset overheat temperature, the first and second valves 9a, 9b of the electromagnetic valve 9 are closed to shut down the fuel supply to the nozzle 8 and simultaneously the first valve 6a of the electromagnetic valve 6 is closed and the second valve 6b thereof which has been in its closed position is open so that the secondary air from the air pump 5 may be released into the atmosphere without being supplied into the head chamber 4.

The exhaust gas cleaning device of the invention constructed as described above operates in the following manner: When the engine is set in motion, since not only the engine but also the combustion chamber 3 are still cold, the first and second valves 9a, 9b of the electromagnetic valve 9 are opened by the actions of the temperature detector 17 and the control relay 16, whereby a relatively large quantity of secondary fuel is supplied through the pipe 10 into the nozzle 8, and concurrently the first valve 6a of the electromagnetic valve 6 is opened, whereby secondary air is supplied from the air pump 5 through the pipe 7 into the head chamber 4. On the other hand, the ignition switch 13 is closed, whereupon sparks are generated across the central electrode 11a of the ignition plug 11 and the nozzle 8 by the actions of the interrupter 14 and the ignition coil 15. Therefore, the secondary fuel injected from the nozzle 8 is ignited and burns while swirling within the head chamber 4 as indicated by the arrow B. The secondary fuel continues to burn while being mixed with the swirling flow A of the exhaust gases introduced into the combustion chamber 3 through the exhaust pipe 2 and, therefore, the exhaust gases which are still at a low temperature are also burned again and the unburned components in said exhaust gases are completely oxidized before reaching the exhaust pipe 2'. As a result of the continuous combustion in the manner described above, the internal temperature of combustion chamber 3 rises quickly and when the internal temperature detected by the temperature detector 17 has reached the normal reaction temperature, for example, between 600° and 700°C, the first valve 9a of the electromagnetic valve 9 is closed and the second valve 9b is held open by the action of the control relay 16, so that a relatively small quantity of fuel is supplied to the nozzle 8. However, the fuel continuously burns satisfactorily within the head chamber 4 and the resulting combustion flames move into the combustion chamber 3 to be mixed with the swirling exhaust gas flow A. In this case, the thermal energy supplied to the exhaust gases is smaller than when both the valves 9a, 9b of the electromagnetic valve 9 are open, but since the combustion chamber 3 has already been heated sufficiently, the combustion gases are re-burned satisfactorily and completely oxidized by the time when they are discharged from the combustion chamber 3. As described, the exhaust gases, after the engine is started and before the temperature of the exhaust gas combustion chamber 3 reaches the normal reaction temperature, are forcibly burned by the combustion of a relatively large quantity of secondary fuel and thus it is possible to completely burn the unburned components in the exhaust gases immediately after starting of the engine.

When the engine is continuously operated at high speeds and under high loads, the temperature of the exhaust gases becomes abnormally high and the exhaust manifold 1 occasionally becomes red-heated. If, under such a condition, the combustion gases of the secondary fuel and the secondary air are continuously supplied into the combustion chamber 3 from the head chamber 4, the combustion chamber 3 will be overheated by the heat of the combustion gases plus the combustion heat of the unburned components in the exhaust gases, resulting in thermal breakage of the structural members of the combustion chamber. According to the present invention, however, the temperature of the combustion chamber before reaching such a high level, i.e., a preset overheat temperature, for example, of about 900°C is detected by the temperature detector 17 and said temperature detector 17 operates the control relay 16 which in turn closes the first valve 6a of the electromagnetic valve 6 and all valves of the electromagnetic valve 9, to shut down the supplies of the secondary fuel and secondary air. Therefore, no combustion takes place within the combustion chamber 3 and said combustion chamber 3 serves merely as a part of the exhaust pipes 2, 2' and cools to the temperature of the exhaust gases. When the temperature of the combustion chamber 3 drops below the preset overheat temperature of about 900°C intermediate of such condition, the supply of the secondary fuel and secondary air is re-started. However, it will be obviously understood that the operation of the control relay 16 in response to two upper and lower preset temperatures has a suitable hysteresis so as to avoid the so-called hunting phenomenon.

In the embodiment described above, the secondary fuel for the combustion of the exhaust gases and the secondary air for the combustion of said secondary fuel are supplied through the common pipe 7 into the head chamber 4 and the quantity of the secondary air is not adjusted incident to the adjustment of the secondary fuel. However, it will be obviously understood that the secondary air may be adjusted according to the varying quantity of the secondary fuel where the secondary fuel is supplied in a particularly large quantity immediately after the engine is started or the secondary air is supplied separately from the secondary fuel, as by supplying the secondary air into the exhaust pipe 2 or the combustion chamber 3. The adjustment of the secondary air can be readily achieved by providing an additional air regulating valve in the secondary air regulating electromagnetic valve 6.

Further, while in the embodiment described above, the overheating of the combustion chamber 3 is prevented by shutting down the supplies of secondary fuel and secondary air, it will be obvious that where the destructive overheating of the combustion chamber will not occur even with small quantities of secondary fuel and secondary air continuously being supplied to said combustion chamber, depending upon the characteristics of the engine and the combustion chamber, it is preferable to continue the supply of said small quantities of secondary fuel and secondary air, instead of completely shutting down the supply of secondary fuel and secondary air, so as to maintain the cleaning effect at a high level.

Figure 4:
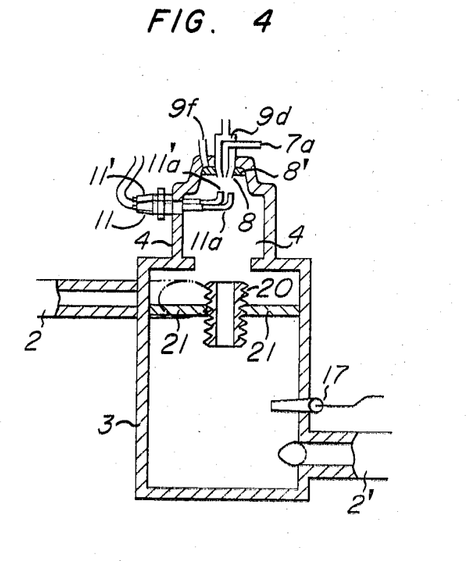
FIG. 4 is a sectional view of the essential portion of another embodiment of the exhaust gas cleaning device of the invention.
Figure 5:
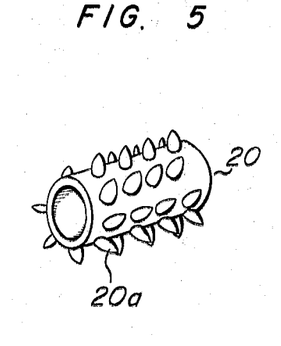
FIG. 5 is a perspective view of the heat accumulator used in the device of the invention.

In the device of the present invention there may be provided a heat accumulator 20 as shown in FIG. 4 which is made of a heat-resistant material such as ceramics. The heat accumulator 20 is fixedly supported by two or more supporting rods 21, so as not to interfere with the flow of the exhaust gases, at a location centrally of the combustion chamber 3 and adjacent the head chamber 4. The accumulator is heated by the combustion gases of the secondary fuel from the head chamber 4. The heat accumulator 20 consists of a cylindrical body having a number of projections 20a on the outer peripheral surface thereof as shown in FIG. 5, so that it may be readily red-heated and may not substantially prevent the passage of the exhaust gases.

The device of the invention comprising the heat accumulator will operates as follows: Namely, when the engine is set in motion (with the ignition switch 13 in its closed position), since not only the engine but also the combustion chamber 3 and the heat accumulator 20 therein are still cold, the first and second valves 9a, 9b of the electromagnetic valve 9 are opened by the action of the temperature detector 17 and the control relay 16, whereby a large quantity of secondary fuel is supplied to the nozzle 8 through the pipe 10. At the same time, the first valve 6a of the electromagnetic valve 6 is opened and secondary air is supplied into the head chamber from the air pump 5 through the pipe 7. On the other hand, the interrupter 14 and the ignition coil 15 are actuated by the closure of the ignition switch 13 to generate sparks across the central electrode 11a of the ignition plug 11 and the nozzle 8. Thus, the fuel injected from the nozzle 8 in an atomized state is ignited and the resulting flame blow into the combustion chamber 3. The high temperature combustion gases of the secondary fuel heat the heat accumulator 20 in the combustion chamber 3 and continue to burn while being mixed with the swirling exhaust gas flow A introduced into said combustion chamber 3 from the exhaust pipe 2. Therefore, the exhaust gases which are still at a low temperature are burned again and the unburned components in the exhaust gases are completely oxidized before reaching the exhaust pipe 2'. As a result of the continuous combustion, the heat accumulator 20 is red-heated and the internal temperature of the combustion chamber 3 rises quickly. When the internal temperature of the combustion chamber detected by the temperature detector 17 has reached the normal reaction temperature in the range, for example, of 600°–700°C, the first valve 9a of the electromagnetic valve 9 is closed by the action of the control relay 16 and the second valve 9b only is held open, so that the quantity of the fuel supplied to the nozzle 8 is decreased. However, the fuel continuously burns satisfactorily within the head chamber 4 and the combustion flames blow into the exhaust gases in the combustion chamber 3. In this case, the thermal energy supplied to the exhaust gases is smaller than when both of the valves 9a, 9b of the electromagnetic valve 9 are open, but since the combustion chamber 3 and the heat accumulator 20 in said combustion chamber have already been sufficiently heated, the unburned components in the exhaust gases are oxidized by contact with the surface of the heat accumulator 20 and the heat accumulator 20 is further heated by the heat of the oxidation reaction. As a result, the heat accumulator 20 retains the temperature of an ignition source and, by virtue of its thermal capacity, serves effectively as an ignition source even under the quickly varying operating mode of the engine. Therefore, the combustion of the secondary fuel injected from the nozzle 8 is required only for the purposes of maintaining the temperature of the heat accumulator and preheating the secondary air, and consequently, the consumption of the secondary fuel can be substantially decreased as compared with the case when the heat accumulator 20 is not provided. Since, for the period from the time when the engine is started to the time when the combustion chamber 3 reaches the normal reaction temperature, the exhaust gases are positively burned with a relatively large quantity of secondary fuel as described above, it is possible to completely burn the unburned components in the exhaust gases immediately after start of the engine.

When the engine is continuously operated at high speeds and under high loads, it is possible that the temperature of the exhaust gases becomes abnormally high and the exhaust manifold 1 becomes red-heated. If the combustion gases of the secondary fuel and the secondary air are continuously supplied from the head chamber 4 into the combustion chamber 3 in such a case, the combustion chamber 3 will be overheated by the heat of said combustion gases plus the combustion heat of the unburned components in the high temperature exhaust gases, resulting in thermal breakage of the structural members of the combustion chamber. However, the temperature of the combustion chamber 3 before it reaches such a high level, i.e., a preset overheat temperature, for example, of about 900°C, is detected by the temperature detector 17 and the control relay is actuated in response to a signal from said temperature detector, whereby all valves of the electromagnetic valve 9 are closed to shut down the supplies of the secondary fuel and secondary air. Therefore, no combustion takes place within the combustion chamber 3 and said combustion chamber serves merely as a part of the exhaust pipes 2, 2' and cools to the temperature of the exhaust gases. When the temperature of the combustion chamber 3 drops below said preset overheat temperature of about 900°C, the secondary fuel and secondary air are supplied again, but it will be obviously understood that the operation of the control relay in response to the two upper and lower preset temperatures has a suitable hysteresis so as to avoid the so-called hunting phenomenon.

The heat accumulator 20 provides an effective ignition source even when the quantity of the secondary fuel supplied is particularly small and the combustion flames thereof are about to be blown off due to a sudden change in flow rate of the exhaust gases, whereby a lowering of the cleaning effect due to extinguishment of the secondary fuel combustion flames can be prevented.

If, in this embodiment, the heat accumulator 20 can be maintained red-hot by the combustion of the exhaust gases with the secondary air and the combustion gases of the secondary fuel are not required after the normal combustion state of the exhaust gases has been obtained within the combustion chamber, the supply of the secondary fuel can be completely stopped by closing the second valve 9b as well as the first valve 9a of the secondary fuel regulating electromagnetic valve 9 by the action of the control relay 16 which is operated by the temperature detector 17.

It will also be understood that the heat generating effect of the heat accumulator 20 and accordingly the exhaust gas cleaning effect can be further enhanced by impregnating the heat accumulator with a catalyst metal such as platinum. The structure of the heat accumulator 20 is not restricted only to the one shown in FIG. 5 but may be of any other form such as a spherical porous body or honeycomb core, provided that it will be readily red-heated and does not substantially interfere with the exhaust gas flow.

Figure 3B:
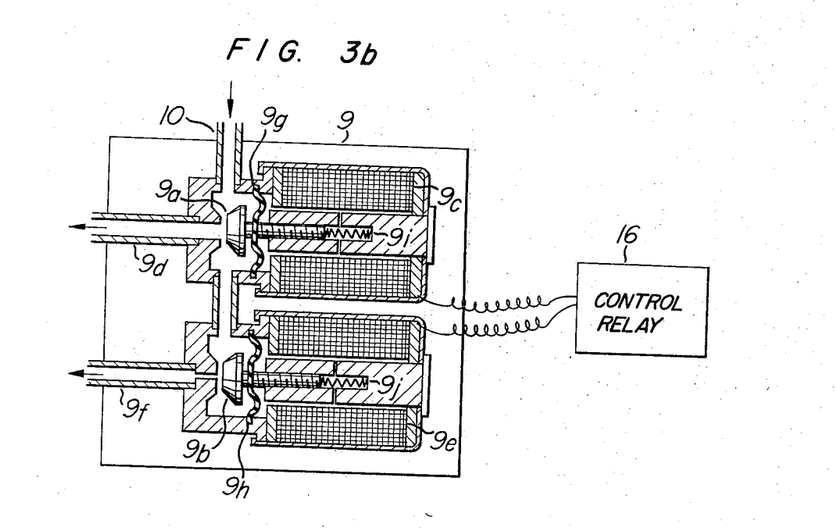
FIG. 3B is a sectional view of another form of the secondary fuel regulating unit.

Another embodiment of the invention will be described hereunder with reference to the drawings. In this embodiment, a fuel injection nozzle 8 is provided generally centrally of the top wall of the head chamber 4 and a fuel evaporator 8' consisting of a porous body is provided surrounding said nozzle 8. The nozzle 8 and the fuel evaporator 8' are supplied with fuel from a fuel tank and a fuel pump, not shown, through a fuel pipe 10, and a secondary fuel regulating electromagnetic valve 9 and fuel pipes 9d, 9f shown in FIG. 3B. In FIG. 3B, parts corresponding to those in FIG. 3A are indicated by same reference numerals. The fuel injected from the nozzle 8 is completely atomized by the air discharged from an air pipe 7a. Ignition plugs 11, 11' respectively having central electrodes 11a, 11'a are fixedly mounted in the head chamber 4 adjacent the nozzle 8 and a fuel evaporator 6'. The nozzle 8 and the fuel evaporator 8' are made of an electrode material and grounded so as to serve simultaneously as ground electrodes cooperating with the central electrodes 11a, 11'a of the ignition plugs 11, 11'. Reference numeral 12 designates a power source, 13 an ignition switch of the engine, 14 an interrupter and 15 an ignition coil. While the ignition switch 13 is closed, the interrupter 14 interrupts intermittently the primary current flowing in the ignition coil 15 and sparks are generated across the central electrodes 11a, 11'a of the ignition plugs 11, 11' and the nozzle 8 and the fuel evaporator 8' by the high voltage induced in a pair of secondary coils, and thus the fuel injected into the head chamber 4 from the nozzle 8 and the fuel supplied to the fuel evaporator 8' are ignited.

Figure 2:
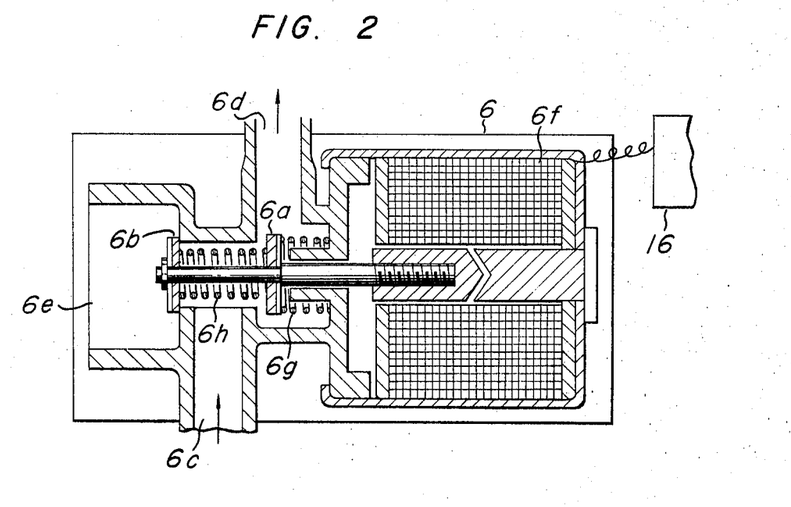
FIG. 2 is a sectional view of the secondary air regulating electromagnetic valve used in the device of the invention.

A secondary air regulating electromagnetic valve 6, as shown in FIG. 2, has interconnected first and second valves 6a, 6b. The first valve 6a opens and closes a passage between an inlet port 6c and an outlet port 6d respectively connected with the pipe 7, and the second valve 6b opens and closes a passage between an inlet port 6c and an outlet port 6e which opens into the atmosphere. The electromagnetic valve 6, when a current is conducted through an electromagnetic coil 6f, takes the position shown in FIG. 2, i.e., the position in which the first valve 6a is open communicating the inlet port 6c and the outlet port 6d with each other and the second valve 6b is closed shutting down the communication between the inlet port 6c and the outlet port 6e. When no current is conducted through the electromagnetic coil 6f, the valve 6 takes the position in which the first valve 6a is closed shutting down the communication between the inlet port 6c and the outlet port 6d and the second valve 6b is opened communicating the inlet port 6c and the outlet port 6e with each other. Reference numeral 6g designates a spring by which the first valve 6a is held closed in the deenergized state of the coil 6f and 6h designates a spring by which the first and second valves 6a, 6b are maintained in predetermined spaced relation.

A secondary fuel regulating electromagnetic valve 9 comprises a main or first valve 9a and an auxiliary or second valve 9b as shown in FIG. 3a. The first valve 9a opens or closes a main passage 9d upon energization or deenergization of an electromagnetic coil 9c, and the second valve 9b opens or closes an auxiliary passage 9f upon energization or deenergization of an electromagnetic coil 9e. Diaphragms 9g, 9h are provided for preventing intrusion of fuel into the electromagnetic coil portions. In the deenergized state of the coils 9c, 9e, the valves 9a, 9b are held closed by springs 9i, 9j respectively.

A control relay 16 is electrically connected with a temperature detector 17 provided at a portion of the combustion chamber 3 where the temperature becomes highest, and to the electromagnetic valves 6, 9 and an ignition switch 13. The control relay 16 operates the electromagnetic valves 6, 9 such that when the temperature detected by the temperature detector 17 is below the normal reaction temperature (e.g., 600°–700°C), the first and second valves 9a and 9b of the electromagnetic valve 9 and the first valve 6a of the electromagnetic valve 6 are opened so that a relatively large quantity of fuel may be supplied to the nozzle 8 and a relatively small quantity of fuel to the fuel evaporator 8', and also a corresponding quantity of secondary air may be supplied into the head chamber 4 through pipes 7, 7'. However when the temperature detected by the temperature detector 17 is in the range from the normal reaction temperature to a preset overheat temperature, e.g., around 900°C, the first valve 9a only of the electromagnetic valve 9 is closed so that a relatively small quantity of secondary fuel may be supplied to the fuel evaporator 8' for the normal combustion, and further when the temperature detected by the temperature detector 17 is above the preset overheat temperature, the first and second valves 9a, 9b of the electromagnetic valve 9 are closed to shut down the fuel supply to the nozzle 8 and simultaneously the first valve 6a of the electromagnetic valve 6 is closed and the second valve 6b thereof which has been in its closed position is opened so that the secondary air from the air pump 5 may be released into the atmosphere without being supplied into the head chamber 4.

A suction vacuum detector 18 is fixedly mounted in the suction manifold 19 of the engine E and electrically connected with the control relay 16 for transmitting thereto a signal representative of the detected suction vacuum. An arrangement is made such that when the signal representative of the suction vacuum is given from the suction vacuum detector 18 to the control relay 16 during acceleration of the engine, the first valve 9a of the secondary fuel regulating electromagnetic valve 9 is opened and a relatively large quantity of fuel is injected from the nozzle 8 into the head chamber 4.

The operation of the exhaust gas cleaning device of the invention constructed as described above will be explained hereunder: Namely, when the engine E is set in motion (with the ignition switch 13 being in its closed position), since not only the engine but also the combustion chamber 3 are still cold, the first and second valves 9a, 9b of the electromagnetic valve 9 are opened by the actions of the temperature detector 17 and the control relay 16, whereby a relatively large quantity of secondary fuel is supplied through the valves 9d and 9f, mainly to the nozzle 8 and partially to the fuel evaporator 8' and concurrently the first valve 6a of the electromagnetic valve 6 is opened, whereby secondary air is supplied from the air pump 5 through the pipe 7 into the head chamber 4. On the other hand, the ignition switch 13 is closed, whereupon sparks are generated across the central electrodes 11a, 11'a of the ignition plugs 11, 11' and the nozzle 8 and the fuel evaporator 8' by the actions of the interrupter 14 and the ignition coil 15, and the secondary fuel injected in an atomized state from the nozzle 8 and the secondary fuel supplied to the fuel evaporator 8' are ignited. The combustion flames of the evaporated fuel together with the large flames from the nozzle swirl within the head chamber 4 as indicated by the arrow B and the resulting combustion gases are discharged into the combustion chamber 3 and mixed therein with the exhaust gases introduced into said combustion chamber from the exhaust pipe 2, while swirling as indicated by the arrow A. Therefore, the exhaust gases which are still at a low temperature are burned again and the unburned components in said exhaust gases are completely oxidized before reaching the exhaust pipe 2'. As a result of the continuous combustion in the manner described above, the internal temperature of the combustion chamber 3 rises quickly and when the internal temperature detected by the temperature detector 17 has reached the normal reaction temperature, for example between 600° and 700°C, the first valve 9a of the electromagnetic valve 9 is closed and the second valve 9b only is held open by the action of the control relay 16, so that the fuel supply to the nozzle 8 is interrupted and a relatively small quantity of fuel only is supplied to the fuel evaporator 8'. However, the fuel continuously burns satisfactorily within the head chamber 4 and the resulting combustion flames move into the combustion chamber 3 to be mixed with the swirling exhaust gas flow A. In this case, the thermal energy supplied to the exhaust gases is smaller than when both the valves 9a, 9b of the electromagnetic valve 9 are open, but since the combustion chamber 3 has already been heated sufficiently, the combustion gases are re-burned satisfactorily and completely oxidized by the time when they are discharged from the combustion chamber 3. As described, the exhaust gases, before the temperature of the exhaust gas combustion chamber 3 reaches the normal reaction temperature after the engine is started, are positively burned by the combustion of a relatively large quantity of secondary fuel and thus it is possible to completely burn the unburned components in the exhaust gases continuously from the time the engine is started.

The fuel supplied to the fuel evaporator 8' expands within said evaporator by virtue of the porosity of the same and evaporates from the surface thereof. The gasified fuel is ignited by the sparks across the ignition plug 11' and the fuel evaporator 8' and burns. In the meantime, the fuel evaporator 8' is heated by the combustion heat of the secondary fuel from the nozzle 8 and thereafter the fuel supplied to the fuel evaporator is evaporated from the surface thereof by the heat possessed by the evaporator.

When the engine is continuously operated at high speeds and under high loads, the temperature of the exhaust gases becomes abnormally high and the exhaust manifold 1 occasionally becomes red-heated. If, under such a condition, the combustion gases of the secondary fuel and the secondary air are continuously supplied into the combustion chamber 3 from the head chamber 4, the combustion chamber 3 will be overheated by the heat of the combustion gases plus the combustion heat of the unburned components in the exhaust gases, resulting in thermal breakage of the structural members of the combustion chamber. However, the temperature of the combustion chamber before reaching such a high level, i.e., a preset overheat temperature, for example, of about 900°C is detected by the temperature detector 17 and said temperature detector 17 operates the control relay 16 which in turn closed the first valve 6a of the electromagnetic valve 6 and all valves of the electromagnetic valve 9, to shut down the supplies of the secondary fuel and secondary air. Therefore, no combustion takes place within the combustion chamber 3 and said combustion chamber serves merely as a part of the exhaust pipes 2, 2' and cools to the temperature of the exhaust gases. When the temperature of the combustion chamber 3 drops below the preset overheat temperature of about 900°C under such condition, the supply of the secondary fuel and secondary air is re-started. However, it will be obviously understood that the operation of the control relay 16 in response to the two upper and lower preset temperatures has a suitable hysteresis so as to avoid the so-called hunting phenomenon.

As described herein, in the exhaust gas cleaning device of the invention for cleaning exhaust gases by burning them in a combustion chamber with secondary fuel and secondary air supplied thereto, larger quantities of the secondary fuel and secondary air are supplied for combustion after starting the engine and before the temperature of the combustion chamber reaches the normal reaction temperature than after said chamber has reached said normal reaction temperature. The unburned components in the exhaust gases are positively burned within the combustion chamber by the sufficient thermal energy generated by the combustion of said secondary fuel. Therefore, there can be achieved such excellent advantage that the exhaust gases can be completely cleaned from immediately after start of the engine, which could not be attained by the conventional exhaust gas cleaning devices. In addition, since the combustion chamber 3 is hollow and its thermal capacity is very small, quick heating of the combustion chamber is possible and hence the time required for bringing the combustion chamber into the normal operative condition can be substantially shortened. Therefore, there is the excellent advantage that the complete cleaning of the exhaust gases can be achieved economically with a relatively short period of time in which a large quantity of secondary fuel is consumed.

Another advantage of the invention is that since the secondary fuel or the secondary fuel and secondary air supplied to the combustion chamber can be decreased or shut down when the temperature of the combustion chamber becomes abnormally high, it is possible to prevent the temperature of the combustion chamber from becoming abnormally high during continuous operation of the engine at high speeds and under high loads, and there can be provided a highly practical, highly efficient exhaust gas cleaning device which is not susceptible to breakage under any operating condition of the engine.

The device of the present invention comprises a fuel evaporator consisting of a porous body and a fuel injection nozzle as secondary fuel supply means. Therefore, in the event when a relatively large quantity of secondary fuel is to be supplied, e.g., before the temperature of the combustion chamber reaches the normal reaction temperature after starting the engine or at the time of quick acceleration of the engine, the required quantity of secondary fuel can be supplied from the fuel injection nozzle which is capable of supplying a large quantity of fuel in an atomized state, whereby a satisfactory combustion cleaning of the exhaust gases can be achieved even when the combustion chamber is cold immediately after the engine is started or at the time of quick acceleration of the engine, and a relatively small quantity of fuel can be supplied from the fuel evaporator in a readily combustible state after the combustion chamber has reached the normal reaction temperature. Therefore, there is the advantage that even when the quantity supplied of the secondary fuel is required to be varied according to the operating condition of the engine or the state of the combustion chamber, an adequate quantity of fuel can be supplied from time to time from the appropriate fuel supply means, whereby highly efficient cleaning of the exhaust gases can be obtained.

The device of the invention further comprises a heat accumulator made of a heat-resistant material such as ceramics and disposed within the exhaust gas combustion chamber, and said heat accumulator is heated by the high temperature combustion gases of the secondary fuel and further heated by the heat of oxidation of the unburned components in the exhaust gases contacting therewith to provide a stable ignition source for the mixture of the exhaust gases and the secondary fuel, whereby the consumption of the secondary fuel can be substantially saved as compared with the case when such a heat accumulator is not provided. In addition, the small quantity of secondary fuel is completely gasified by the fuel evaporator before combustion. Therefore, the cleaning of the exhaust gases can be achieved economically with high efficiency.

In the present invention, the quantities of the secondary fuel and secondary air are regulated according to the internal temperature of the exhaust gas combustion chamber in such a manner that, before the temperature of the combustion chamber reaches the normal reaction temperature after the engine is started, larger quantities of the secondary fuel and secondary air are supplied than after said combustion chamber has reached said normal reaction temperature, and the heat accumulator disposed in the combustion chamber is positively heated by a sufficient amount of thermal energy generated by the combustion of said secondary fuel to positively burn the unburned components in the exhaust gases, whereby complete cleaning of the exhaust gases can be achieved from immediately after starting the engine which could not be achieved by the conventional devices, in spite of the fact that the heat accumulator of a large thermal capacity is disposed within the combustion chamber. When the temperature of the combustion chamber becomes abnormally high, the secondary fuel or the secondary fuel and the secondary air is or are decreased or shut down, whereby overheating of the combustion chamber can be prevented during continuous operation of the engine at high speeds and under high loads. Therefore, a highly practical, highly efficient exhaust gas cleaning device can be obtained which is highly economical with respect to fuel consumption and will not be subjected to damage under any operating condition of the engine.

Although the engine used in the first embodiment (FIG. 1) is a reciprocating engine, it will be obviously understood that the same effect can be obtained in case of a rotary piston engine, and that the effect of the invention is more remarkable when the combustion chamber is located closer to the exhaust manifold because the temperature of the exhaust gases is higher. It will also be understood that when the device of the invention is used by connecting it with the exhaust manifold, it is more advantageously used with a rotary piston engine than with a reciprocating engine as shown in the drawings, because the number of exhaust ports of the former is less than that of the latter.

We claim:

1. An exhaust gas cleaning device for cleaning the exhaust gases from a vehicle engine by reburning said exhaust gases in an exhaust gas combustion chamber provided intermediate of the exhaust pipe of said engine with secondary fuel and secondary air being supplied to said combustion chamber, said exhaust gases and said secondary air being blown into said exhaust gas combustion chamber in a tangential direction with respect thereto so as to form an eddy or vortical current of the burning gas within said exhaust gas combustion chamber; said exhaust gas cleaning device comprising: a combustion chamber for reburning the exhaust gases being led into said chamber in the exhaust pipe of the engine; means for supplying the secondary air into said combustion chamber for reburning the exhaust gases; secondary air regulating valve means for regulating the quantity of the secondary air to be supplied to said combustion chamber, said secondary air regulating valve means including a first air valve for opening and closing the passage which supplies said secondary air to said combustion chamber, and a second air valve for opening and closing another passage leading to the atmosphere, said two air valves being carried on the same valve stem and being actuated by an electromagnet electrically controlled by a control relay, said first air valve being opened and said second air valve being closed when said electromagnet is energized, and said first air valve being closed and said second air valve being opened when said electromagnet is deenergized; means for supplying the secondary fuel into said combustion chamber for reburning the exhaust gases; secondary fuel regulating valve means for regulating the quantity of the secondary fuel to be supplied into said combustion chamber, said secondary fuel regulating means including a first fuel valve for opening a primary passage which supplies said secondary fuel to said combustion chamber upon energization of a first electromagnet being controlled by said control relay, and a second fuel valve for opening an auxiliary passage which is smaller in cross section than said primary passage and runs parallel to said primary passage upon energization of a second electromagnet being controlled by said control relay; and a control relay for controlling said secondary air regulating valve means and said secondary fuel regulating means in response to the detected temperature within said exhaust gas combustion chamber, said control relay being adapted for controlling said two regulating valve means in such a manner as to supply more secondary fuel and secondary air before the temperature within said combustion chamber reaches its normal operating temperature than after said temperature is established, and to decrease said secondary air and secondary fuel to be supplied to said combustion chamber when the temperature within said combustion chamber is higher than a predetermined level.

2. An exhaust gas cleaning device for cleaning the exhaust gases from a vehicle engine by reburning said exhaust gases in an exhaust gas combustion chamber provided intermediate of the exhaust pipe of said engine with secondary fuel and secondary air supplied to said combustion chamber, said exhaust gases and said secondary air being blown into said exhaust gas combustion chamber in a tangential direction with respect thereto so as to form an eddy or vortical current of the burning gas within said exhaust gas combustion chamber; said exhaust gas cleaning device comprising: a combustion chamber for reburning the exhaust gases being led into said chamber in the exhaust pipe of the engine; means for supplying the secondary air into said combustion chamber for reburning the exhaust gases; secondary air regulating valve means for regulating the quantity of the secondary air to be supplied to said combustion chamber; means for supplying the secondary fuel into said combustion chamber for reburning the exhaust gases; secondary fuel regulating valve means for regulating the quantity of the secondary fuel to be supplied into said combustion chamber; a control relay for controlling said secondary air regulating valve means and said secondary fuel regulating means in response to the detected temperature within said exhaust gas combustion chamber; a suction vacuum detector electrically connected to said control relay, wherein said control relay is adapted to control said secondary air regulating valve means and said secondary fuel regulating valve means in such a manner as to supply relatively large amounts of secondary fuel and a predetermined amount of secondary air to said combustion chamber when the temperature of said chamber is rising up from the cold state to a normal reaction temperature and to supply a relatively small amount of secondary fuel and said predetermined amount of secondary air when said normal reaction temperature is established within said combustion chamber, and to supply said relatively large amount of secondary fuel and said predetermined amount of secondary air when the engine is quickly accelerated upon detection of a suction vacuum and the temperature within said combustion chamber, and to cut off said secondary fuel and said secondary air when the temperature within said chamber becomes excessively high.

3. An exhaust gas cleaning device as claimed in claim 2, further comprising at least one heat accumulator located in the center portion of said exhaust gas combustion chamber.

4. An exhaust gas cleaning device as claimed in claim 2, wherein said secondary air regulating valve means comprises a first air valve for opening and closing the passage which supplies secondary air to said combustion chamber, a second air valve for opening and closing another passage leading to the atmosphere, said first and second air valves being carried on the same valve stem and being adapted to be actuated by an electromagnet in such a manner as to open said first air valve with said second valve being closed when said electromagnet is energized and to close said first air valve when said electromagnet is de-energized; said secondary fuel regulating valve means comprising a first fuel valve for opening and closing a primary passage for supplying secondary fuel to said fuel injection nozzle, and a second fuel valve for opening and closing another passage which is parallel to said primary passage but smaller in cross section and leasing to said fuel evaporator, a first electromagnet for actuating said first fuel valve to open upon energization thereof, and a second electromagnet for actuating said second fuel valve to open upon energization thereof; said control relay being electrically connected to each of said electromagnets to energize or de-energize them in such a manner as to energize both electromagnets of said secondary fuel regulating valve means as well as said electromagnet of said secondary air regulating valve means before the temperature within said combustion chamber rises to the normal reaction temperature, to de-energize said first electromagnet of said secondary fuel regulating valve means with the other electromagnets being energized after said normal reaction temperature is established within said combustion chamber, to energize all electromagnets upon detecting the increase of the suction vacuum, when the engine is quickly accelerated, and to de-energize all electromagnets when the temperature within said combustion chamber goes higher than a predetermined level.

5. An exhaust gas cleaning device for cleaning the exhaust gases from a vehicle engine by reburning said exhaust gases in an exhaust gas combustion chamber provided intermediate of the exhaust pipe of said engine with secondary fuel and secondary air being supplied to said combustion chamber, said exhaust gases and said secondary air being blown into said exhaust gas combustion chamber in a tangential direction with respect thereto so as to form an eddy or vortical current of the burning gas within said exhaust gas combustion chamber; said exhaust gas cleaning device comprising: a combustion chamber for reburning the exhaust gases being led into said chamber in the exhaust pipe of said engine; means for supplying the secondary air into said combustion chamber for reburning the exhaust gases; secondary air regulating valve means for regulating the quantity of the secondary air to be supplied to said combustion chamber; means for supplying the secondary fuel into said combustion chamber for reburning the exhaust gases; secondary fuel regulating valve means for regulating the quantity of the secondary fuel to be supplied into said combustion chamber; a control relay for controlling said secondary air regulating valve means and said secondary fuel regulating means; and a suction vacuum detector electrically connected to said control relay wherein said control relay is adapted to control said secondary air regulating valve means and said secondary fuel regulating valve means to supply secondary fuel and secondary air to said engine when said engine is quickly accelerated upon detecting the suction vacuum, and wherein said means for supplying secondary fuel terminate in a fuel injection nozzle inserted into said combustion chamber and at a fuel evaporator surrounding said fuel injection nozzle.

* * * * *

UNITED STATES PATENT OFFICE
CERTIFICATE OF CORRECTION

Patent No. 3,837,814  Dated September 24, 1974

Inventor(s) Yasusi Tanasawa, Mitsumasa Yamada, Mikiji Ito and Kenji Ishiguro

It is certified that error appears in the above-identified patent and that said Letters Patent are hereby corrected as shown below:

In the heading:

Item [73], change "Toyota Jidosha Kogyo Kabushika Kaisha" to --Toyota Jidosha Kogyo Kabushiki Kaisha--.

Signed and sealed this 22nd day of April 1975.

(SEAL)
Attest:

RUTH C. MASON
Attesting Officer

C. MARSHALL DANN
Commissioner of Patents
and Trademarks